May 17, 1932. R. H. DEPEW, JR 1,858,393
AIRPLANE WHEEL BRAKE OPERATING MEANS
Filed Aug. 8, 1928
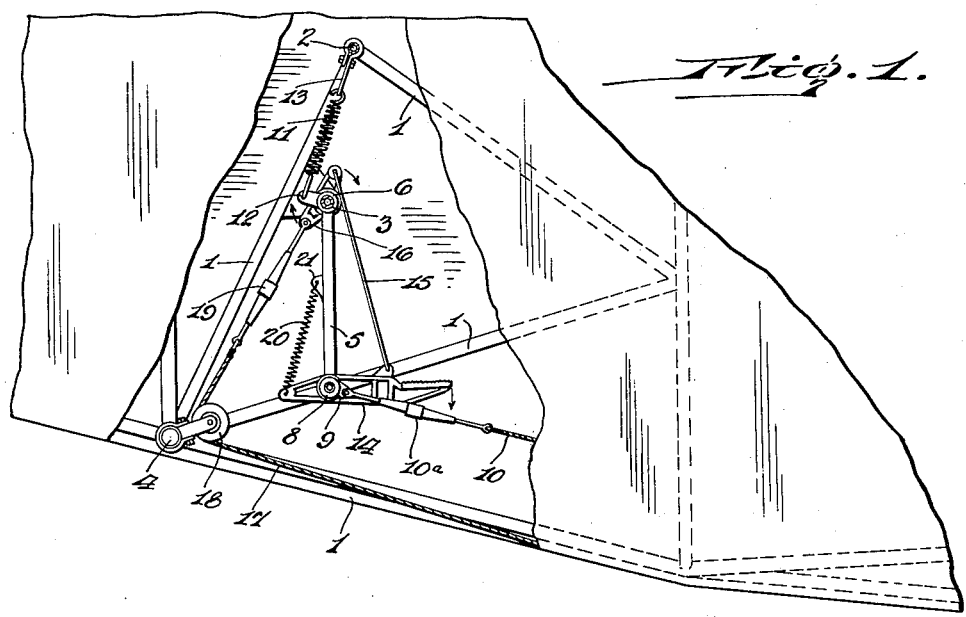
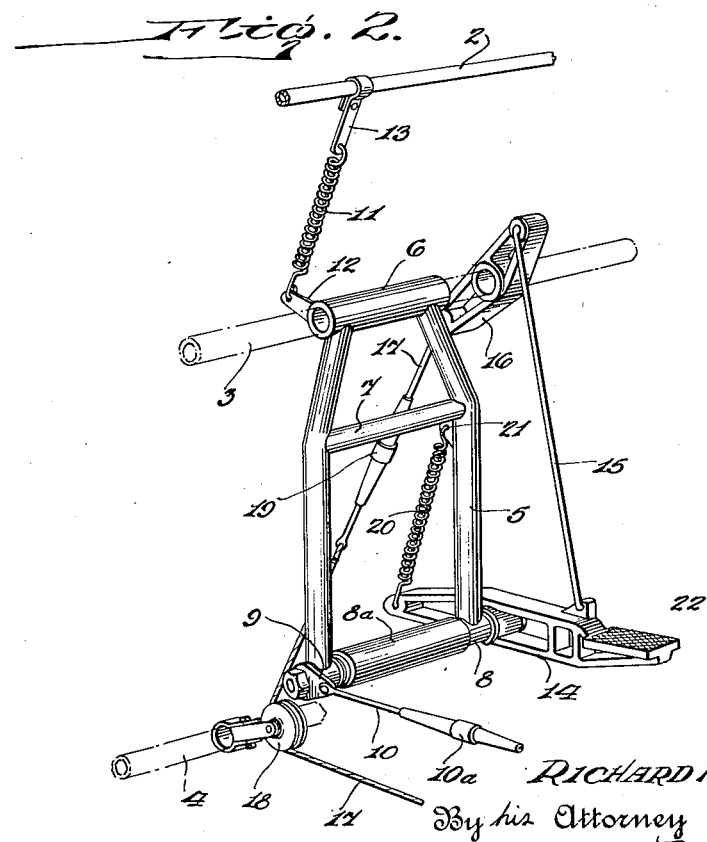
Inventor
RICHARD HENRY DEPEW, JR.
By his Attorney
B. H. Carpenter Patented May 17, 1932

1,858,393

UNITED STATES PATENT OFFICE

RICHARD HENRY DEPEW, JR., OF FOREST HILLS, NEW YORK, ASSIGNOR, BY MESNE ASSIGNMENTS, TO THE AVIATION PATENT AND RESEARCH CORPORATION, A CORPORATION OF NEW YORK

AIRPLANE WHEEL BRAKE OPERATING MEANS

Application filed August 8, 1928. Serial No. 298,231.

This invention relates to airplanes in general and in particular to means for controlling landing operations of an airplane.

The general object of the invention is to provide a new and improved form of controlling means for operating the airplane wheel brakes.

In landing operations and in handling an airplane on the ground, it is desirable at times to execute a quick turn. This is usually accomplished by operating the control mechanism of the vertical rudder so as to cause the tail of the airplane to swing to the right or left as desired, under action of the air flow.

The present invention contemplates the provision of independently operable wheel brakes. The application of one brake will, of course, cause the machine to turn in one direction and the application of the other brake causes the machine to turn in the other direction. If both brakes are equally applied the machine may be slowed down without turning. The application of one brake causes a pivoting movement about the wheel on which the brake has been set, due to the combined action of any forward motion of the airplane, the pulling force exerted by the propeller, and the retarding force exerted by the locked wheel. The whole effect is to cause the airplane to swing about at the will of the pilot.

It is the principal object of this invention to provide a new and improved controlling mechanism for both of the wheel brakes and associate the same with the vertical rudder controls of an airplane in such a manner that it is unnecessary for the pilot to remove either of his feet from the rudder control mechanism in order to apply the brakes regardless of whether it is desired to execute a turn while landing or to bring the airplane to rest without making a turn, thus making it possible for the pilot to exercise perfect control over the airplane while taxiing along the ground.

Another object of this invention is to provide an arrangement of braking mechanism whereby the pilot may operate the brakes by a thrust of his foot.

Other objects and advantages of the present invention will become apparent from the following specification, claims and appended drawings, in which:—

Fig. 1 is a partial vertical longitudinal section of the fuselage of an airplane equipped with this invention.

Fig. 2 is a perspective view showing the construction and arrangement of the improved brake and vertical rudder controlling mechanism.

The numerals 1, Fig. 1, represent the tubular members which form the sides of the fuselage frame. The numerals 2, 3, and 4 represent cross-bracing members which join together the side frames of the fuselage and also serve to support the vertical rudder and wheel brake controlling mechanism in a manner now to be described.

In the embodiment disclosed in the drawings, the invention is shown applied to the well-known Fairchild plane in which double pedal control of the vertical rudder is employed. In this control two pedals are provided, one for each of the pilot's feet. From each pedal a cable extends to the vertical rudder. These cables are so connected to the rudder that forward movement of the left pedal swings the rudder to the left, as is well-known to all mechanics skilled in the art.

The brake mechanism for the left wheel is associated with the left pedal and that for the right wheel with the right pedal. The brake mechanism for each wheel is independent but similar except that one, of course, is constructed right and the other left, therefore, only one pedal and the brake mechanism associated therewith will be described.

Pivoted upon and hanging from the cross bracing member 3 is a pedal frame 5 which is composed of side pieces which are joined together by members 6, 7 and 8 respectively. The members 6, 7 and 8 are preferably composed of hollow tubing and, as best illustrated in Fig. 2, the member 6 is concentric with the cross bracing member 3 which serves as an axis upon which the frame 5 is free to swing. The lower member 8 is provided with a sleeve 8a upon which the pilot's foot rests and which serves to minimize the wear caused by the constant rubbing of the pilot's shoe on the member 8.

The member 8 is provided with a short extension upon which is pivoted a link 9 to which a cable 10 is attached. The cable 10 extends to the mechanism for operating the vertical rudder. A suitable adjusting means 10a is provided for the purpose of adjusting the tension of the cable 10. A spring 11 which is attached at one end to a lug 12 formed integral with the frame 5 and at its other end to a link 13 pivoted upon the cross bracing member 2, tends to swing the frame 5 in a clockwise direction, Fig. 1, and serves to keep the cable 10 always taut. The mechanism for directly operating the vertical rudder forms no part of the present invention and need not be described herein nor shown in the drawings. It will be sufficient to state that when the pedal frame 5 is moved forward by the pressure of the pilot's foot, that is, to the left as shown in Fig. 1, the vertical rudder will be swung to one side in a well-known manner so as to cause the tail of the airplane to swing quickly about thus causing the airplane to execute a turn.

Pivoted upon an extension of the member 8 is a brake control pedal 14 which is connected by means of a rod or link 15 to one arm of a lever 16 which is pivoted upon the cross bracing member 3 of the fuselage frame. A cable 17, connected to the other arm of the lever 16, passes over a pulley 18 mounted on the cross member 4 and is connected to the operating mechanism of one of the wheel brakes. A suitable adjusting means 19 provides means for adjusting the tension of the cable 17 and to compensate for any stretching that may have taken place after the cable has been in constant use for any length of time. A spring 20, interposed between an ear 21 integral with the frame 5 and the other end of the brake pedal 14, serves to keep the cable 17 taut. The pedal 14 is widened at 22 so as to form a resting surface or heel plate upon which the pilot may rest his foot. The resting surface 22 may be provided with suitable antifriction material such as rubber or may be merely roughened as shown in Fig. 2 in order to prevent slipping of the pilot's foot.

An airplane which is constructed with the combined brake and vertical rudder control pedal just described, of course, as has hereinbefore been stated, is provided with two of the pedals, one for each foot, the pedals being arranged in the following manner: The control pedal 5 which is intended to be operated by the left foot is connected to the vertical rudder by means of its cable 10 so that when the pedal is pushed forward by the pilot's left foot (to the left as viewed in Fig. 1) the vertical rudder will be swung to the left and the tail of the airplane will consequently swing to the right due to the pressure produced by the motion of the air on the side of the rudder, and as a result the airplane will execute a left turn in the well-known manner. Similarly the right pedal 5 is connected so that the pressure of the pilot's foot upon it will cause the airplane to execute a right turn.

The brake pedal 14 which is mounted upon the left vertical rudder control pedal 5 is connected by means of its cable 17 to the left wheel brake operating mechanism while the brake pedal 14 associated with the right vertical rudder control pedal is connected by means of its cable 17 to the right wheel brake.

The two vertical rudder control pedals 5 are mounted side by side upon the cross bracing member 3 within easy reach of the pilot's feet and are so assembled that the brake pedals 14 are adjacent to each other, that is both are between the control pedals 5.

When the airplane is in flight the pilot's feet will ordinarily rest upon the cross members 8 of the pedal frames 5 or he will rest his heels on the floor and the balls of his feet on the cross members 8. The vertical rudder may be controlled at will by applying foot pressure to either of the pedals. Movement of the pedals 5 has no effect on the brake mechanism so long as no pressure is exerted upon the brake pedals 14. This is due to the flexible connection provided by the springs 20 which are just strong enough to keep the pedals 14 in position and the cables 17 taut and which are not capable of exerting any appreciable pull on the cables 17. Furthermore, the pivot points of the rods or links 15 on the levers 16 are so close to the center of the cross member 3 that little relative movement is produced between the brake pedals 14 and the corresponding rudder control pedals 5.

If it is desired to apply the brakes during the time when the airplane is in motion on the ground, it is merely necessary for the pilot to twist his feet sidewise slightly until his heels rest upon the resting surfaces 22 of the brake pedal 14 and then to apply pressure as desired, as a result of which one or both of the wheel brakes will be applied. This operation, of course, will not effect the position of the vertical rudder. Since the pilot's heels rest on the brake levers, he is in a position to exert a tremendous force in braking.

It is desirable at times to execute a quick turn while the airplane is in motion on the ground in order to avoid obstructions, careless spectators, or to place the airplane in position for a takeoff. In order to accomplish this result the pilot merely twists one foot slightly sidewise until his heel rests upon the resting surface of the corresponding brake pedal and then presses downward upon the pedal with as much pressure as may be desirable according to the sharpness of the turn it is necessary to make. For instance, in order to execute a right turn all that is necessary is to press downward on the resting surface of the right brake pedal with the right foot. A downward and forward pressure results in the application of the right wheel brake and also in the turning of the vertical rudder as usual in executing a right turn. The combined action of the momentum of the airplane and the retarding action of the right wheel brake causes the airplane to swing about the right wheel as a pivot thus executing a right turn. This action may be augmented by the propeller if desired.

The foregoing description and illustration discloses in accordance with the patent law a preferred embodiment of my invention. I do not desire to limit myself in any way by this disclosure to a pedal controlled machine. My invention is equally applicable to machines employing a rudder control bar.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. The combination in an airplane having wheel brakes and rudder controlling mechanism of separate manually operable brake operating means for each wheel including a separate lever for each wheel associated with said rudder controlling mechanism and adjacent thereto but separately and independently engageable and operable.

2. In an airplane a rudder operating member including a portion to be engaged by the foot of a pilot and a landing wheel brake operating mechanism including a lever pivotally mounted on said member adjacent said portion, and extending outwardly toward the pilot whereby the pilot may engage said lever and operate said brake by swinging his feet without removing his foot from said foot position on the rudder controlling member.

3. In an airplane having at least two wheels, a rudder operating device provided with foot position for engagement by the feet of a pilot, brakes for the airplane wheels, and brake operating means including a lever mounted adjacent to one foot position and connected to one wheel brake and a lever mounted adjacent the other foot position and connected to another wheel brake whereby the pilot may at will apply either or both brakes without removing his feet from the foot positions.

4. In an airplane the combination with a rudder operating mechanism including a foot operated member having a foot position, of a wheel brake operating mechanism including a foot operated lever pivoted on said member and extending adjacent to said foot position and substantially at right angles thereto whereby the lever may be engaged by the heel of the foot without removing the foot from the foot position.

5. In an airplane the combination with a manually operable rudder operating mechanism including a pivoted member having a foot position for a foot of a pilot, of a wheel brake operating mechanism including a lever pivotally mounted substantially coaxially with said member and connected to a wheel brake, and a second lever mounted on said member adjacent to said foot position and extending outwardly from said foot position toward the pilot and operatively connected to said first lever whereby the pilot may engage said second lever with his heel by swinging his foot while still engaging the foot position and operate said brake by pressing downward with his heel.

6. In an airplane the combination with a foot operated rudder operating mechanism including a pivotally mounted member for the left foot and a pivotally mounted member for the right foot, each member having a foot position, of a wheel brake operating mechanism including a foot operated lever pivotally mounted on one member adjacent the foot position thereon and a foot operated lever pivotally mounted on the other member adjacent the foot position on the latter and independent means connecting one of said levers to one wheel brake and the other of said levers to another wheel brake.

In testimony whereof I affix my signature.

RICHARD HENRY DEPEW, Jr.